(12) United States Patent
Amini et al.

(10) Patent No.: US 11,229,023 B2
(45) Date of Patent: Jan. 18, 2022

(54) SECURE COMMUNICATION IN NETWORK ACCESS POINTS

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 113 days.

(21) Appl. No.: 15/842,609

(22) Filed: Dec. 14, 2017

(65) Prior Publication Data

US 2018/0309570 A1  Oct. 25, 2018

Related U.S. Application Data

(60) Provisional application No. 62/488,258, filed on Apr. 21, 2017.

(51) Int. Cl.
*H04W 72/04* (2009.01)
*H04W 72/12* (2009.01)
(Continued)

(52) U.S. Cl.
CPC .......... *H04W 72/0426* (2013.01); *G06F 8/65* (2013.01); *H04L 1/0004* (2013.01); *H04L 1/18* (2013.01);
(Continued)

(58) Field of Classification Search
CPC ......... H04W 12/0023; H04W 12/0027; H04W 12/0609; H04W 12/12; H04W 88/08; H04W 92/045; H04W 92/12; H04W 4/50; H04L 41/082; H04L 41/0803; H04L 41/0806; H04L 63/123; H04L 63/0428;
(Continued)

(56) References Cited

U.S. PATENT DOCUMENTS 4,200,770 A  4/1980  Diffie et al.
7,606,175 B1  10/2009  Maufer
(Continued)

FOREIGN PATENT DOCUMENTS

CN  1416232 A  5/2003
CN  1987798 A  6/2007
(Continued)

*Primary Examiner* — Tae K Kim
(74) *Attorney, Agent, or Firm* — Perkins Coie LLP; Colin Fowler

(57) ABSTRACT

Disclosed is an access point (AP) for a network that includes security features for interacting with devices on the network. The other devices on the network may be other APs, client devices, or a backend configuration server. The access point includes a private key that is used to verify signals to and from (the private key may be different for different functions). In the case of other APs, the private key is used to verify control signals sent between the APs to identify and prevent a hijacked AP from taking control of the network by sending false control signals. In the case of a client device, the client device may use the subject AP's private key to identify that the subject AP is a trusted member of the network that may receive data. In the case of the backend server, the subject AP may verify configuration updates via use of the private key to prevent loading of malicious firmware.

17 Claims, 8 Drawing Sheets

(51) Int. Cl.
| | |
|---|---|
| *H04L 1/00* | (2006.01) |
| *H04W 40/24* | (2009.01) |
| *H04W 24/02* | (2009.01) |
| *H04L 1/18* | (2006.01) |
| *H04L 27/34* | (2006.01) |
| *H04L 29/06* | (2006.01) |
| *H04W 40/02* | (2009.01) |
| *H04W 16/18* | (2009.01) |
| *G06F 8/65* | (2018.01) |
| *H04L 9/08* | (2006.01) |
| *H04W 48/20* | (2009.01) |
| *H04W 92/20* | (2009.01) |
| *H04W 84/12* | (2009.01) |
| *H04W 4/06* | (2009.01) |
| *H04L 29/12* | (2006.01) |
| *H04L 29/08* | (2006.01) |
| *H04W 4/80* | (2018.01) |
| *H04W 84/20* | (2009.01) |
| *H04W 88/08* | (2009.01) |

(52) U.S. Cl.
CPC ............ *H04L 9/0816* (2013.01); *H04L 27/34* (2013.01); *H04L 63/14* (2013.01); *H04L 69/18* (2013.01); *H04L 69/22* (2013.01); *H04W 16/18* (2013.01); *H04W 24/02* (2013.01); *H04W 40/02* (2013.01); *H04W 40/244* (2013.01); *H04W 48/20* (2013.01); *H04W 72/1242* (2013.01); *H04L 1/0003* (2013.01); *H04L 1/188* (2013.01); *H04L 1/1812* (2013.01); *H04L 61/1511* (2013.01); *H04L 61/2015* (2013.01); *H04L 69/324* (2013.01); *H04L 69/329* (2013.01); *H04W 4/06* (2013.01); *H04W 4/80* (2018.02); *H04W 84/12* (2013.01); *H04W 84/20* (2013.01); *H04W 88/08* (2013.01); *H04W 92/20* (2013.01)

(58) Field of Classification Search
CPC ..... H04L 63/08; H04L 63/0823; H04L 63/12; H04L 9/3247; H04L 9/3236; H04L 9/3263; H04L 9/3268; H04L 9/0891; H04L 9/32; H04L 9/3242; G06F 8/65; G06F 9/445

See application file for complete search history.

(56) References Cited

U.S. PATENT DOCUMENTS

| | | | |
|---|---|---|---|
| 7,668,128 B1 | 2/2010 | Benveniste | |
| 8,214,653 B1* | 7/2012 | Marr | G06F 21/572 713/189 |
| 8,259,682 B2 | 9/2012 | Dutta et al. | |
| 9,525,759 B2 | 12/2016 | Zhang et al. | |
| 10,133,867 B1* | 11/2018 | Brandwine | H04L 63/1408 |
| 10,142,444 B2 | 11/2018 | Reynolds et al. | |
| 10,257,868 B2 | 4/2019 | Wang et al. | |
| 10,484,980 B1 | 11/2019 | Jiang et al. | |
| 10,750,415 B2 | 8/2020 | Hirudayaraj et al. | |
| 10,785,718 B2 | 9/2020 | Li et al. | |
| 10,798,702 B2 | 10/2020 | Amini et al. | |
| 2001/0002486 A1* | 5/2001 | Kocher | H04L 9/002 713/171 |
| 2004/0117626 A1* | 6/2004 | Andreasyan | H04L 9/0841 713/175 |
| 2004/0218683 A1 | 11/2004 | Batra et al. | |
| 2005/0233693 A1* | 10/2005 | Karaoguz | H04H 20/57 455/3.06 |
| 2005/0243765 A1 | 11/2005 | Schrader et al. | |
| 2007/0064609 A1 | 3/2007 | Igarashi | |
| 2008/0065816 A1* | 3/2008 | Seo | G06F 8/65 711/103 |
| 2008/0076392 A1* | 3/2008 | Khetawat | H04W 12/1006 455/411 |
| 2008/0076393 A1* | 3/2008 | Khetawat | H04W 16/16 455/411 |
| 2008/0076412 A1* | 3/2008 | Khetawat | H04W 24/02 455/432.1 |
| 2008/0080414 A1 | 4/2008 | Thubert et al. | |
| 2009/0165086 A1* | 6/2009 | Trichina | G06F 7/588 726/2 |
| 2009/0214036 A1* | 8/2009 | Shen | G06Q 30/02 380/270 |
| 2009/0320110 A1* | 12/2009 | Nicolson | H04L 9/3268 726/6 |
| 2010/0135201 A1* | 6/2010 | Lewis | G06F 8/65 370/328 |
| 2010/0182959 A1 | 7/2010 | Cook et al. | |
| 2010/0190457 A1 | 7/2010 | Tu et al. | |
| 2011/0010543 A1* | 1/2011 | Schmidt | H04W 12/10 713/168 |
| 2011/0041003 A1* | 2/2011 | Pattar | H04W 12/10 714/4.3 |
| 2011/0087887 A1* | 4/2011 | Luft | H04L 9/3247 713/178 |
| 2011/0173457 A1* | 7/2011 | Reh | G06F 21/572 713/191 |
| 2011/0202983 A1* | 8/2011 | Pope | H04L 63/061 726/7 |
| 2012/0005369 A1 | 1/2012 | Capone et al. | |
| 2012/0005480 A1* | 1/2012 | Batke | G06F 21/572 713/175 |
| 2012/0066499 A1* | 3/2012 | Ali | G06F 21/31 713/170 |
| 2013/0185563 A1* | 7/2013 | Djabarov | G06F 8/654 713/176 |
| 2013/0198838 A1* | 8/2013 | Schmidt | H04L 9/3234 726/22 |
| 2013/0268689 A1 | 10/2013 | Leucht-Roth | |
| 2014/0006787 A1* | 1/2014 | Measson | H04W 12/04 713/171 |
| 2014/0119303 A1 | 5/2014 | Kwon et al. | |
| 2014/0123124 A1* | 5/2014 | Gray | G06F 8/654 717/170 |
| 2014/0192785 A1 | 7/2014 | Gong | |
| 2015/0071307 A1 | 3/2015 | De Smet et al. | |
| 2015/0245182 A1* | 8/2015 | Scagnol | H04L 43/065 370/312 |
| 2015/0261521 A1* | 9/2015 | Choi | H04L 9/3247 713/176 |
| 2015/0271017 A1* | 9/2015 | Seligson | H04L 41/0813 370/254 |
| 2015/0312041 A1* | 10/2015 | Choi | H04L 63/0823 713/175 |
| 2015/0317481 A1* | 11/2015 | Gardner | H04L 9/3221 726/2 |
| 2015/0363576 A1* | 12/2015 | Medvinsky | G06F 21/10 726/26 |
| 2015/0382328 A1 | 12/2015 | Jiang et al. | |
| 2016/0029356 A1 | 1/2016 | Bhanage et al. | |
| 2016/0036814 A1* | 2/2016 | Conrad | H04W 12/0023 713/171 |
| 2016/0036956 A1* | 2/2016 | Debates | G06F 16/951 455/419 |
| 2016/0119052 A1 | 4/2016 | Frerking et al. | |
| 2016/0198350 A1 | 7/2016 | Lou et al. | |
| 2016/0212745 A1 | 7/2016 | Hiertz et al. | |
| 2016/0227440 A1 | 8/2016 | Forssell et al. | |
| 2016/0262160 A1 | 9/2016 | Mo | |
| 2016/0262163 A1* | 9/2016 | Gonzalez Garrido | H04W 16/10 |
| 2016/0280370 A1* | 9/2016 | Canavor | B64C 39/024 |
| 2016/0294829 A1* | 10/2016 | Angus | H04L 63/0876 |
| 2016/0301566 A1 | 10/2016 | Ramasubramani et al. | |
| 2016/0366229 A1* | 12/2016 | Yamaura | H04L 67/146 |
| 2017/0026966 A1 | 1/2017 | Gao et al. | |
| 2017/0086152 A1 | 3/2017 | Li et al. | |

(56) References Cited

U.S. PATENT DOCUMENTS

| | | |
|---|---|---|
| 2017/0090909 A1* | 3/2017 | Guo .................... G06F 8/66 |
| 2017/0093645 A1 | 3/2017 | Zhong et al. |
| 2017/0093800 A1* | 3/2017 | Wiseman ............. H04L 9/3247 |
| 2017/0104580 A1* | 4/2017 | Wooten .................... G06F 8/65 |
| 2017/0118198 A1* | 4/2017 | Cuff ...................... G06F 21/41 |
| 2017/0126411 A1* | 5/2017 | Piqueras Jover ..... H04L 9/3247 |
| 2017/0187537 A1* | 6/2017 | Kim ..................... H04L 9/0866 |
| 2017/0195459 A1* | 7/2017 | e Costa .................. H04L 67/34 |
| 2017/0201499 A1* | 7/2017 | McLaughlin ....... H04L 63/0428 |
| 2017/0208418 A1* | 7/2017 | Conan .................. H04L 5/0035 |
| 2017/0249135 A1* | 8/2017 | Gandhi .................... G06F 8/65 |
| 2017/0265066 A1* | 9/2017 | Vyas ..................... H04W 8/18 |
| 2017/0310655 A1* | 10/2017 | Sethi .................. H04L 12/4633 |
| 2017/0331670 A1 | 11/2017 | Parkvall et al. |
| 2017/0346644 A1* | 11/2017 | Cambou ............. H04L 9/3278 |
| 2017/0359190 A1* | 12/2017 | Nadathur ............ H04L 12/2803 |
| 2018/0054492 A1* | 2/2018 | Kim ..................... H04W 4/00 |
| 2018/0091315 A1* | 3/2018 | Singhal ................ H04L 9/3268 |
| 2018/0098263 A1 | 4/2018 | Luo et al. |
| 2018/0183603 A1* | 6/2018 | Liu ...................... H04L 9/3247 |
| 2018/0183723 A1 | 6/2018 | Cariou et al. |
| 2018/0196945 A1* | 7/2018 | Kornegay ................ G06F 21/85 |
| 2018/0239897 A1* | 8/2018 | Ventura .................... G06F 21/53 |
| 2018/0278625 A1* | 9/2018 | Cammarota .......... H04L 63/045 |
| 2018/0278697 A1 | 9/2018 | Cariou et al. |

FOREIGN PATENT DOCUMENTS

| | | |
|---|---|---|
| CN | 101442402 A | 5/2009 |
| CN | 102291794 A | 12/2011 |
| CN | 103067095 A | 4/2013 |
| CN | 103167631 A | 6/2013 |
| CN | 103460666 A | 12/2013 |
| CN | 103648109 A | 3/2014 |
| CN | 104796355 A | 7/2015 |
| CN | 104955102 A | 9/2015 |
| CN | 105050081 A | 11/2015 |
| CN | 106102074 A | 11/2016 |
| CN | 106575324 A | 4/2017 |
| CN | 107864490 A | 3/2018 |
| CN | 108738017 A | 11/2018 |
| WO | 2016162763 A1 | 10/2016 |

\* cited by examiner

SECURE COMMUNICATION IN NETWORK ACCESS POINTS

CROSS-REFERENCE TO RELATED APPLICATION

This application claims the benefit of U.S. provisional patent application No. 62/488,258, filed on Apr. 21, 2017, which application is incorporated herein in its entirety by this reference thereto.

TECHNICAL FIELD

The disclosure relates to security in network devices. The disclosure more particularly relates to security in communications and updates to and from network access points.

BACKGROUND

Wireless access points broadcast information to a number of devices using a number of communication protocols. One such protocol is IEEE 802.11, better known as WiFi. WiFi provides Internet access to wireless devices and also provides in-network communication between devices. In order to increase the range of WiFi networks, multiple access points are often employed. Multiple access points within a given network communicate to one another wirelessly to transmit configuration data and firmware updates.

Another protocol type available to access points are machine-to-machine protocols. The most famous of such protocols is commonly known as Bluetooth. Machine-to-machine protocols enable communication on similar frequency bands as WiFi, though machine-to-machine protocols tend to have significantly lower power and frequency channel sizes.

Problems inherent in wireless networks supported by access points include security concerns of communications between devices on a given network.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Multi-Band Wireless Networking System

The multi-band wireless networking system (also referred to herein as "system") includes a number of wireless networking devices. Each of the wireless networking devices (also referred to herein as "access point" or "node") of the system has multiple (e.g., three to five) wireless radio components for wireless communications over multiple (e.g., three to five) wireless bands. The system dynamically and automatically selects a channel at which the system is wirelessly connected to the client devices (also referred to herein as "clients"). In some embodiments, each client device is wirelessly connected to the system at a different wireless channel.

At least one of the wireless networking devices is connected to the Internet and serves as a router (also referred to as "base"). The remaining wireless networking device(s) serve as satellite(s) that are wirelessly connected to the router via a dedicated wireless channel. One example of the multi-band wireless networking system is the NETGEAR® Orbi® system.

Figure 1:
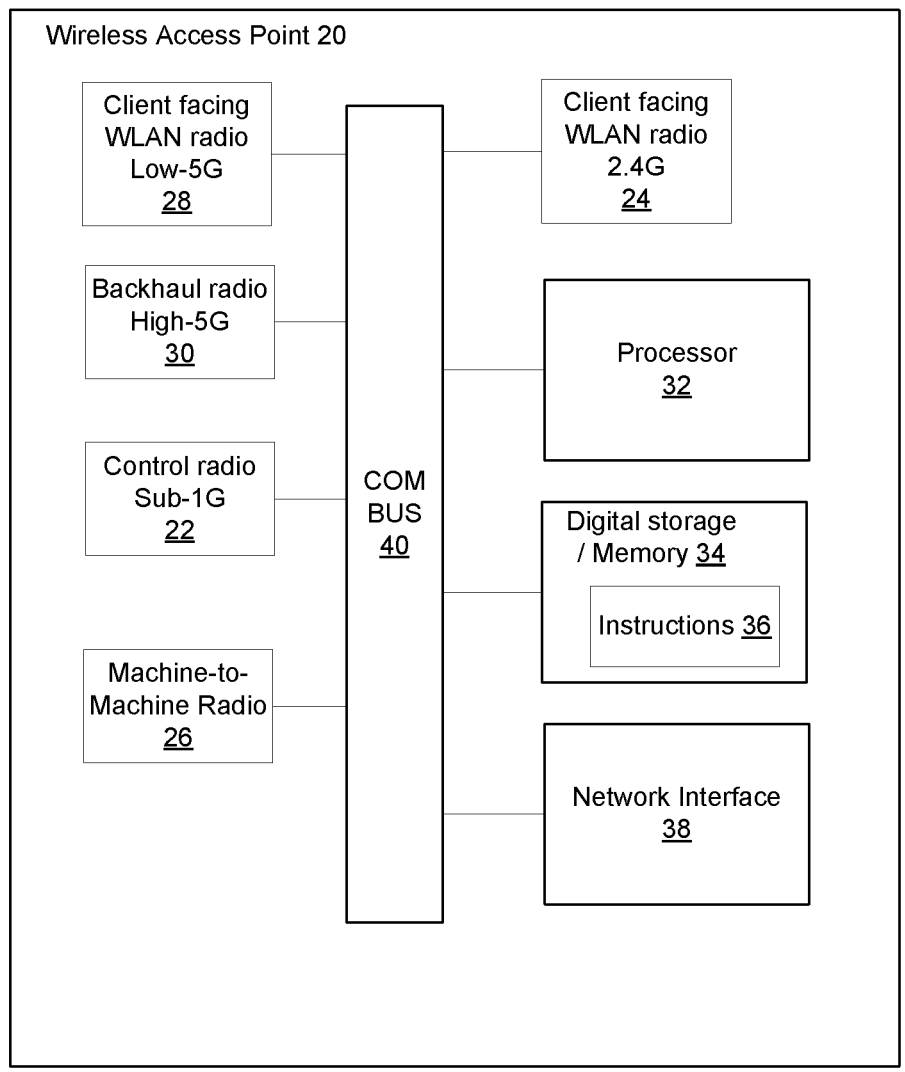
FIG. 1 is a block illustration of an access point.

FIG. 1 is a block illustration of a wireless access point 20. The system conducts an initial channel selection when the system turns on. The system then conducts a channel change based on a schedule. If there is a need for immediate channel change (e.g., sudden interference on a specific channel), the system conducts a real-time channel change as well.

In some embodiments, the wireless access points 20 (also referred to herein as "APs") of the system include radio components for a number of wireless bands, such as Sub 1 Ghz radio 22, 2.4 GHz band radio 24, M2M 2.4 Ghz radio 26, 5 GHz low band radio 28, and 5 GHz high band radio 30. The AP 20 also includes a processor 32 for executing program logic, and a digital storage or memory 34 including instructions 36 to be executed by the processor 32. Each AP 20 includes a network interface 38 for connecting to a wired network and providing overall access to the Internet to the system, though generally only the base unit or base AP is actually connected. These components are in communication using a communications BUS 40.

The Sub 1 G radio 22 and the 5 Ghz high band radio 30 may be dedicated to the wireless communications among the APs 20 of the system. The wireless communications among the APs 20 of the system are called backhaul communications. As a general matter, backhaul communications generally refer to two different sorts of communications: coordination and control communications ("control signal") and communications propagating the data passed throughout the network. The latter of these communications is much more bandwidth intensive. This is because these communications include all files, streaming content, video game data, and other large communications downloaded and uploaded across the network. For the purposes of this disclosure, the data intensive portion communication between the APs will continue to be referred as "backhaul" communications, and the control and coordination communications are referred to as the "control signal" communications.

The other bands are available for use for wireless communications between the APs 20 of the system and client devices. Client devices may communicate over a number of protocols. The wireless communications between the wireless networking devices of the system and client devices are called fronthaul communications. These radios are also referred to as "client facing."

The APs 20 communicate the fronthaul channel selections with other units through the dedicated backhaul channel. In some embodiments, units having higher-priority network traffic have a higher priority in picking the fronthaul channel over other units.

The system of APs 20 make decisions regarding fronthaul channel selections in either a centralized or distributed way. In a distributed way, each unit makes a decision on channel selection for itself. For example, in some embodiments, a base unit selects a fronthaul channel first. Then, each satellite AP 20 selects a fronthaul channel after the base unit establishes a backhaul link with the base unit. The system optimizes the channel selection based on some regular schedule. In some embodiments, units handling higher-priority network traffic have a higher priority in picking the fronthaul channel over other APs 20 during system boot-up or during scheduled channel optimization.

In a centralized way, the base AP 20 makes decisions of channel selections for all APs 20 of the system. This may be communicated through a control signal. Each satellite AP 20 establishes a dedicated control signal link with the base unit and scans the channels in the fronthaul band(s). Each satellite AP 20 sends detailed information regarding candidates of fronthaul channels to the base unit. The detailed information includes, e.g., scan results on all channels in the fronthaul band(s) and interference on all channels in the fronthaul band(s). The base AP makes the centralized decision on channel selection periodically over time among other control communications.

However, were one of the APs 20 to become compromised, that compromised AP would be able to send false controls signals to other APs 20. Further, the network propagation may be interrupted, or hijacked. A hijacked network can redirect users of client devices to content they did not intend to access.

Figure 2:
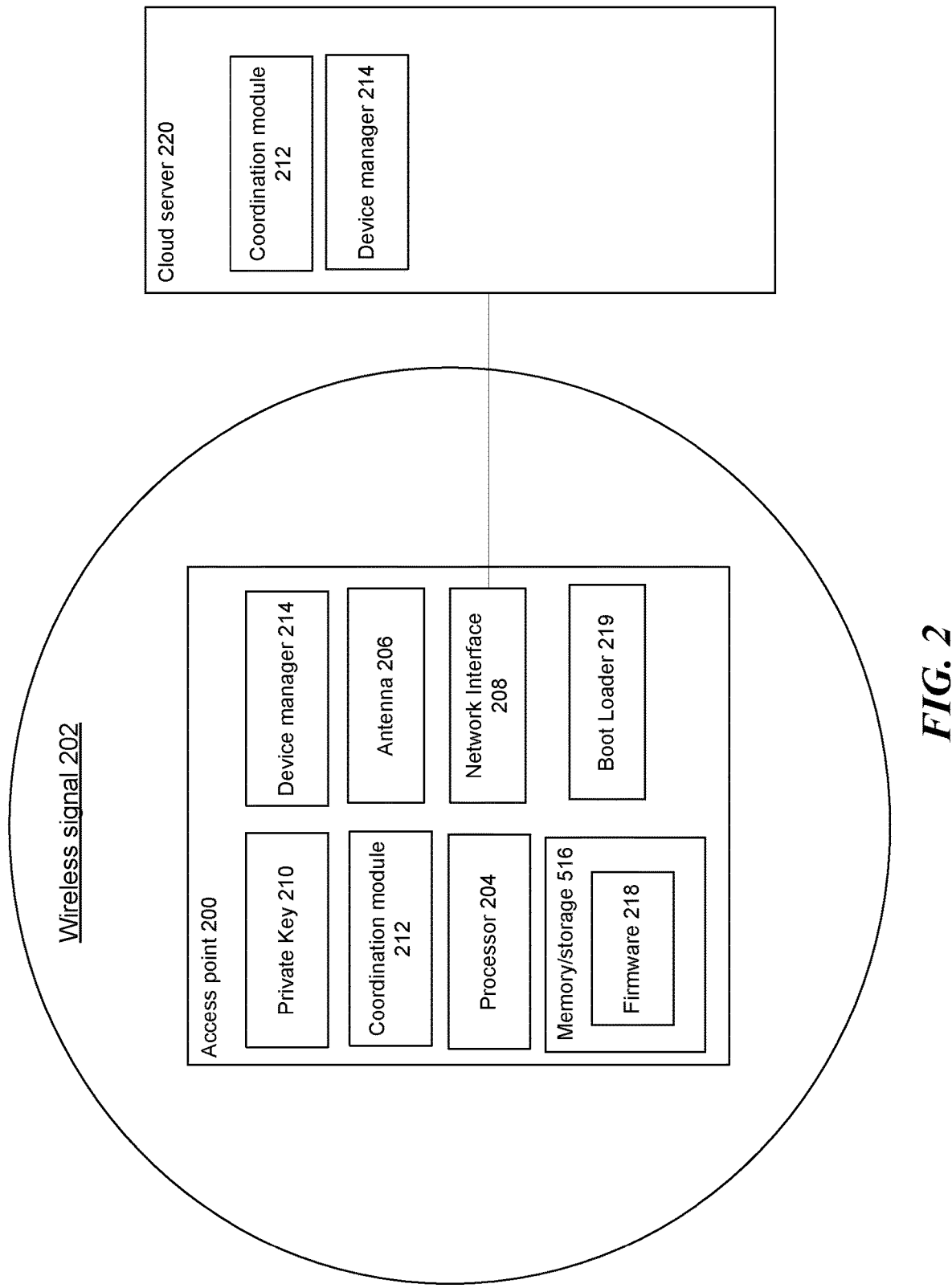
FIG. 2 is a system block diagram of an access point, according to various embodiments.

FIG. 2 is a system block diagram of an access point 200, according to various embodiments. An access point 200 transmits a wireless signal 202 which clients use to connect to the access point 200 and, there through, the Internet. The access point 200 is processor based and, therefore, includes a processor 204. Further included are at least one antenna 206 transmitting and receiving wireless communications and a network interface 208 for communicating with the Internet.

The access point 200 additionally communicates with neighboring access points 200 within the same network over a backhaul channel. Each access point is constructed similarly and has an organized topology based on the local environment.

The access point 200 includes additional modules: a private key 210, a configuration module 212, and a device manager 214. The private 210 is a cryptographic key designed to verify and decode messages received by the access point 200. In some embodiments, there are multiple private keys 210 used for different types of communication. In some embodiments, the private key 210 resides on the AP 200 and is never transmitted, shared, or revealed. The AP 200 may have no function (software or otherwise) that reveals the private key 210. The private key 210 is initialized at manufacture and only known by the manufacturer or a backend cloud server 220. In this way, the private key 210 has little to no exposure and can be used to verify instructions from the cloud server 220.

The AP 200 may also include a secure boot loader 219. The boot loader 219 includes an original version of the device's firmware. In an event of a compromise, the AP 200 may revert to original firmware by running the boot loader function 219 that is verified by the private key 210.

Types of cryptographic keys 210 may vary; examples include: trusted platform modules, physical unclonable functions, cryptocurrency accounts (e.g., Bitcoin, Ethereum, etc.). In some embodiments, the private key 210 of an AP 200 is unique across the entire line of APs 200. Thus, if one AP 200 becomes compromised and reveals its individual private key 200 to a malicious actor, the whole line of APs 200 are not individually compromised. In some cases, the private key 210 is used only to decrypt, though in others, the private key 210 may also be used to encrypt communications. In some embodiments, a second public key is used to encrypt communications with the access point 200. Where multiple access points 200 are on the same network, communications between the APs 200 are decrypted using the private key 210.

The coordination module 212 further directs client roaming to and from one of a number of access points 200 in a network system. In some embodiments, one coordination module 212 in a network of access points 200 is determined to be the primary coordination module and controls channel designation and roaming commands across the entire network system. In other embodiments, the coordination modules 212 of all access points 200 of a network system work in tandem to come to a consensus regarding the channel designation and roaming commands. In either of these embodiments, to prevent malicious takeover of the network, the roaming commands are verified by the private key 210. The verifying entity may be either a subsidiary coordination module 212 or the device itself.

In some embodiments, the client devices are not trusted entities are do not have access to the private key 210. In these embodiments, only APs 200 and the cloud server 220 are trusted entities. The private key 210 verifies communication between devices that have an expectation of "trust" to prevent malicious or compromised APs from compromising the rest of the network.

In some embodiments, the dynamic traffic profile 218 contains different observations for different periods of time (e.g., on weekends as opposed to week days, or during evening as opposed to midday). Further measured throughput at each of these times may also vary, and the observed local interference changes. Accordingly, the coordination module 512 adjusts operations to match the given day of week or time of day.

The device manager 214 is used to keep track of the type of device and operating system of historically and currently connected devices. Knowing the device/OS type of a given client improves the handling of the client from access point 200 to access point 200. Some clients accept BTM roaming recommendations, whereas some will not. Some clients will blacklist an access point based on the access point taking certain actions in a given period of time. The device manager 214 stores the device type/OS version for each client and follows a set of configuration instructions for all communications with a client device of each respective type/version. The device manager 214 also recognizes client devices that are trusted entities. An example of a client device that lends naturally to being a trusted entity is a device made by the same manufacturer as the AP 200. In this manner, the devices—the AP 200 and the client—may be manufactured with trusted communication. A trusted client device does not necessarily have to be manufactured by the same company—rather, two partnered companies could also achieve the same result with a coordinated manufacture process.

The device manager 214 may be configured by observed behavior by the access point 200 or from external configuration by a cloud server 220. In some embodiments, the cloud server 220 includes a coordination module 212 and a device manager 214. Coordination by the cloud server 220 enables learning and coordination by all access points 200 across all network systems of compatible access points 200.

The cloud server 220 may also coordinate updates to firmware 218 of the APs 200 from time to time. In order to prevent compromise of the APs 200, the firmware updates are verified by the private key 210.

When a given AP 200 does become compromised, given the relationship to the cloud server 220, the cloud server 220 may permanently deactivate the AP 200 remotely. Such permanent deactivation is colloquially referred to as "bricking".

Figure 3:
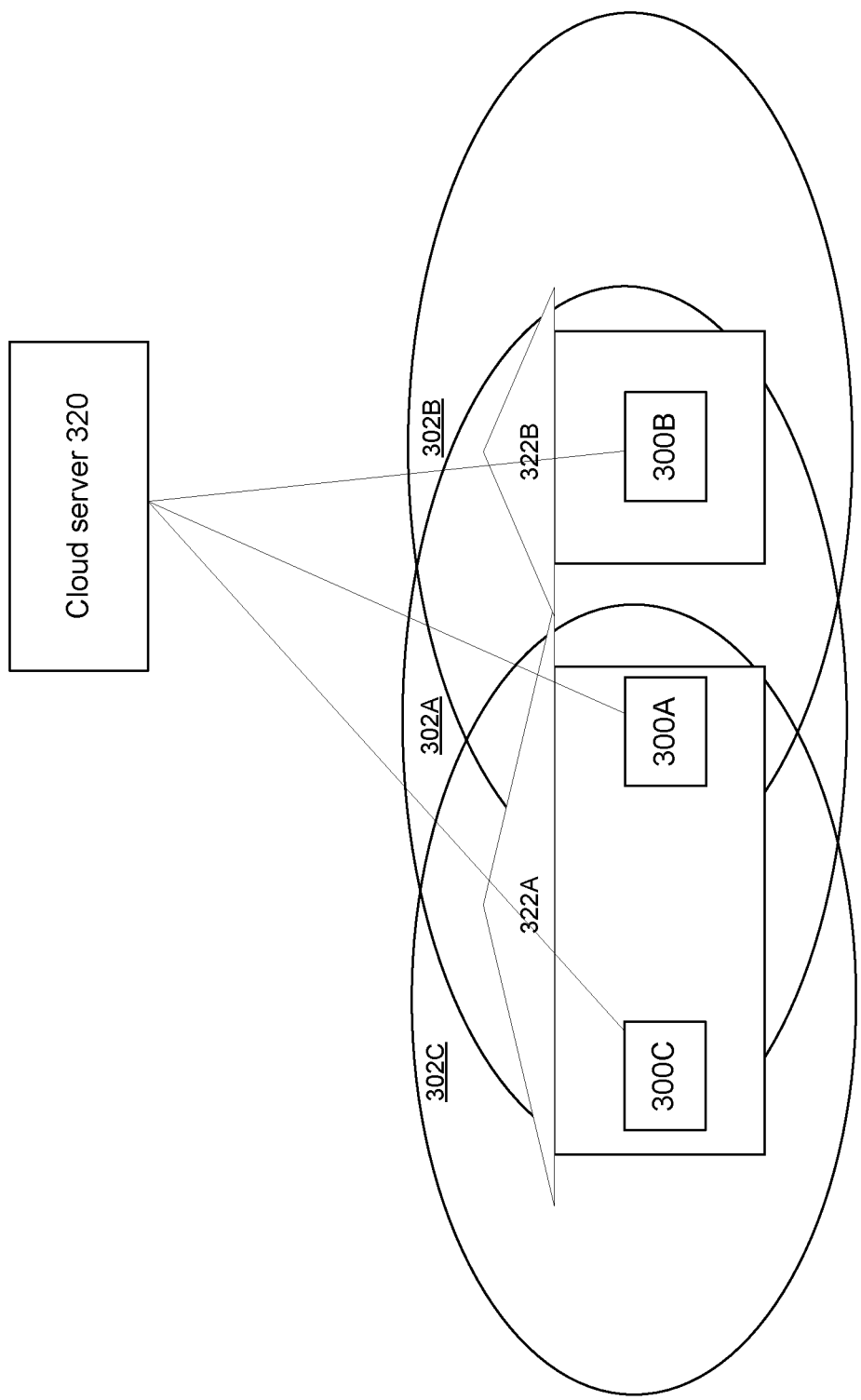
FIG. 3 is an illustrative example of a cloud configuration of a number of access points.

FIG. 3 is an illustrative example of a cloud configuration of a number of access points. In an illustrative example, two houses 322A and 322B are neighbors. Each home has a respective access point 300A and 300B broadcasting independent wireless signals 302A and 302B. The wireless signals 302A and 302B are separate networks, and clients of one generally do not have access to the other. Nevertheless, the range of each wireless signal 302A and 302B overlap and cover at least part of the neighbor's home. In such an instance, where wireless signals 302A and 302B operate within the same band, each will interfere with the other.

However, where each of the access points 300A and 300B are communicatively connected to the same cloud server 320, the channel usage of each access point 300A and 300B may be coordinated with one another. As each access point 300A and B is associated with different networks and different users, neither network is provided preference over one another, but each network can work cooperatively. For example, channels designated for clients on each network may be chosen so as to not interfere with one another. As a given access point 300 reaches maximum connected clients, this cooperation is less effective. Before that threshold, coordination enables improved throughput for both systems.

Some variations are available in multi-access point systems. Assume an example where access point 300A is additionally networked with access point 300C. Access point 300C broadcasts wireless signal 302C. Wireless signal 302C does not overlap on house 322B, and thus it is unlikely that clients of 300B will experience interference from wireless signal 302C. Accordingly, coordination between the networks of 300A/300C and 300B may proceed where the channels used by 300B are not used by 300A, but are instead used by 300C.

To identify that two given networks are in fact connected to the same cloud server 320, a given access point detecting external networks may transmit network IDs to the cloud server 320 for verification. Where the cloud server 320 recognizes the second network, the cloud server 320 is enabled to coordinate cooperation between the networks without sharing any private information between users.

The system can use different utility functions on top of channel models for modeling different types of traffics and then optimize the channel accordingly. For example, voice applications do not need a significant amount of bandwidth but require less outage (i.e. higher latency). A suitable channel can be selected for a unit that serves a voice application.

The system can also use artificial intelligence and machine learning technologies to model client location patterns for roaming purposes. When an access point "roams" a connected client, or station, this refers to the process of pushing the client to another access point. A number of methods may cause roaming. A first method entails basic service set ("BSS") transition management, or "BTM." Specifically, BTM requests can be thought of as the infrastructure offering advice to the client. The infrastructure recommends the client re-associate to a particular access point.

A second method to roam a client uses drops and temporary blacklists. Specifically, an access point with a connected client drops that client and prevents the client from re-associating. In addition, any access points except the intended access point will forbid connection. Therefore, the device seeking a connection will connect with the only available access point.

For example, the system can learn from the pattern that when a client device's RSSI (Received Signal Strength Indicator) drops on some unit, it is likely that the client device is moving to another location, and whether the client device should be roamed from one unit to another access point or not. Such learning can be used to avoid extra information connection and avoid unnecessary state transitions between units.

APs 300 that are on the two different networks 302B and 302A/C, but communicate with the same cloud server 320, are not necessarily trusted entities. While these APs 300 may be configured to trust one another, this is not necessarily the default setting. As the APs 300 are in different households 322A and B, each is likely owned by a different person/entity. In such a case, AP 300B is not able to affect the operation of APs 300A and C. Whether malicious or otherwise, AP 300B has no relation to the other APs 200A and C, and thus is not able to transmit verified communications by default.

In such circumstances, the cloud server 320 coordinates which APs 300 trust one another. For example, during configuration each AP 300 has a private key of which the cloud server 320 is aware and is used to provide secure communication regarding the private keys to use between APs 300. The original private key (associated with communications between the AP 300 and the cloud server 320) may be established at manufacture. However, at start up, generally only one AP (e.g., 300A) in a given network will have a wired connection to Internet services. Thus, in order for another AP 300C on the same network to establish trust with the first AP 300A, the second AP 300C will either need to verify with the cloud server 320, accept the command using physical/hardware controls locally (e.g., a button that activates a brief period of universal trust), or merely start up with universal trust. Regardless of the method of establishing trust with the first AP 300A, a new private key may be established between the two APs 300A and C. In this manner, if a given AP is resold or retired, it is not able to compromise another AP's original or master private key with the cloud server 320. Thus, a given AP 300 may have specific private keys in order to communicate with each trusted entity.

Types of Private Keys

Designers of secure distributed systems, when considering the exchange of information between systems, must identify the endpoints of communication. The composition and makeup of the endpoint is as important to the overall ability of the system to serve, as is an authentication and attestation device of the system, as is the communications protocol. Endpoints are minimally comprised of asymmetric keys, key storage, and processing that protects protocol data items. Classic message exchange based on asymmetric cryptography suggests that messages intended for one and only one individual can be encrypted using a public key.

Furthermore, the message can be protected from tampering by signing with the private key. Keys are communication endpoints, and improperly managed keys can result in loss of attestation and authentication. Additionally, improperly configured endpoints may also result in loss of attestation and authentication ability.

A Trusted Platform Module (TPM) is an implementation of a defined set of capabilities that is intended to provide authentication and attestation functionality for a computing device, and to protect information by controlling access to plain-text data.

A TPM is self-sufficient as a source of authentication and as a means of enhancing the protection of information from certain physical attacks. A TPM requires the cooperation of a TCG "Trusted Building Block" (outside the TPM, that is also part of the computing device) in order to provide attestation and protect information from software attacks on the computing device. Typical TPM implementations are affixed to the motherboard of a computing device. A computing device that contains both a TPM and a Trusted Building Block is called a Trusted Platform. Trusted Platforms offer improved, hardware-based security in numerous applications, such as file and folder encryption, local password management, S-MIME e-mail, VPN and PKI authentication, and wireless authentication for 802.1x and LEAP.

A trusted platform should provide at least three basic features: Protected storage, Integrity measurement, and Integrity reporting. All three of these functions are related to attestation, which is the process of vouching for the accuracy of information. All forms of attestation require reliable evidence of the attesting entity. This can be provided by shipping TPMs with an embedded key called the Endorsement Key (EK). The EK is used in a process for the issuance of credentials for another type of key, called an Attestation Identity Key (AIK). A platform can attest to its description of platform characteristics that affect the integrity (trustworthiness) of a platform.

External entities can attest to shielded locations, protected capabilities, and Roots of Trust. Attestation can be understood in four dimensions: Attestation by the TPM, attestation to the platform, attestation of the platform, and authentication of the platform.

Attestation by the TPM is an operation that provides proof of data known to the TPM. This is done by digitally signing specific internal TPM data using an Attestation Identity Key (AIK). The acceptance and validity of both the integrity measurements and the AIK itself are determined by a verifier.

Attestation to the platform is an operation that provides proof that a platform can be trusted to report integrity measurements. It is performed using the set or subset of the credentials associated with the platform and used to issue an AIK credential.

Attestation of the platform is an operation that provides proof of a set of the platform's integrity measurements. This is done by digitally signing a set of measurements using an AIK.

Authentication of the platform provides evidence of a claimed platform identity. The claimed identity may or may not be related to a user or any actions performed by the user. Platform Authentication is performed using any signing key that cannot be removed from a TPM. Certified keys (i.e., keys signed by an AIK) have the added semantic of being attestable. Since there are an unlimited number of such keys associated with the TPM, there are an unlimited number of ways that a platform can be authenticated.

The Root of Trust for Storage (RTS) protects keys and data entrusted to the TPM. The RTS manages a small amount of volatile memory where keys are held while performing signing and decryption operations.

Inactive keys may be encrypted and moved off-chip to make room for other more active keys. Management of the key slot cache is performed external to the TPM by a Key Cache Manager (KCM). The KCM interfaces with a storage device where inactive keys may be stored indefinitely. The RTS doubles as a general purpose protected storage service allowing opaque data also to be stored.

The RTS is optimized to store small objects roughly the size of an asymmetric key minus overhead (e.g., ~210 byte payload). A variety of object types can be stored such asymmetric and asymmetric keys, pass-phrases, cookies, authentication results, and opaque data. There are three key types that are not opaque to the TPM: AIK keys, Signing keys, and Storage keys.

The Storage Root Key (SRK) is embedded in the TPM and cannot be removed from the TPM, but can be erased. However, a new SRK may be created as part of creating a new platform owner. This has the side-effect of leaving all encrypted data objects controlled by the previous SRK. The Storage Root Key is the root of a hierarchy of encrypted keys, where each parent key is used to encrypt (wrap) its child keys.

AIKs are direct children of the SRK. They are used to sign integrity measurements that have been gathered by the platform and to sign certificates describing other keys that cannot leave the TPM. TPMs can have as many or as few AIK keys as are required. This protects privacy when the platform owner is concerned about the consequences of collusion by entities that receive signed information from a Trusted Platform.

In cryptography, a physical unclonable function (PUF) is a physical entity that is embodied in a physical structure and is easy to evaluate but hard to predict. Further, an individual PUF device must be easy to make but practically impossible to duplicate, even given the exact manufacturing process that produced it. In this respect, it is the hardware analog of a one-way function. The name "physical unclonable function" might be a little misleading, as some PUFs are clonable, and most PUFs are noisy and therefore do not achieve the requirements for a function.

PUF is a function that behaves like a random function, in the sense that it generates random output values. These random output values are unpredictable, even for attackers with physical access to the system. Even where another knows the particular function of a PUF, it is impossible to clone or reproduce another copy of the same physical system to reproduce the results. Due to the manufacture process of a digital system there are fabrication variations. These variations are uncontrollable and unpredictable. Thus, no two circuits will perform exactly the same. The small variations are used as a private key.

A given PUF may be used for device identification. This is based on the observation that the same PUF circuitry will generate different PUF data of different chips. So in that way, two different chips still have different PUF data, and this PUF data can be used to distinguish the two chips. PUF can also be used for key generation and storage. This is much more secure than storing keys in memory, because key in the memory is vulnerable to physical attacks and other attacks. In the case of a PUF generated key, even after an invasive attack, an attacker will not be able to replicate the key. When the user authenticates the device, the user will send the challenge to the device, and the challenge will return a response. If the response is correct, then the system will be authenticated. Otherwise it is not. This pair can also be also used for encryption. For example, data can be encrypted using the PUF as the secret key. Whoever has the public key can use it to decrypt the message.

Cryptocurrency keys (public and private) are associated with wallets or entities on a blockchain. Owners of a private key can generate records on a blockchain under the identity of their public key. Thus, other devices of the system may process actions from a trusted device (as identified by the public key). In this fashion, the private key of a given device never need be shared between parties. A given trusted device may have a certain level of permission such that at the highest level the trusted device may be able to affect the subject device's firmware; at the lowest level of trust, a trusted device may be able to communicate with the subject device.

The above types of private keys may be used by themselves or even in combination. For example, a PUF may be used as a private key on a blockchain. The cryptocurrency network for which the subject blockchain operates may issue a challenge to a device, and the device responds based on its respective PUF. Then, a record is generated on the blockchain with the device's public key. The record instructs the actions of another device.

Figure 4:
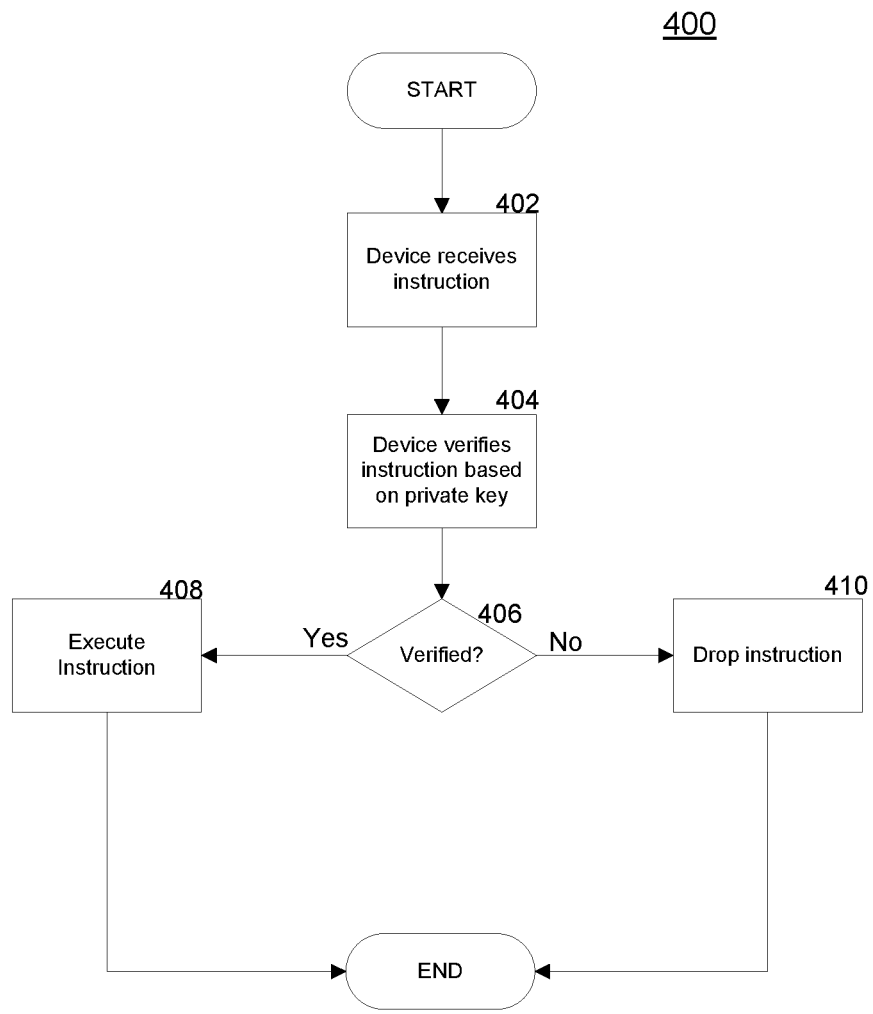
FIG. 4 is a flow chart illustrating cryptographic verified communications.

FIG. 4 is a flow chart illustrating cryptographic verified communications in a network. In step 402, a given device receives instructions over a network. The device may be an AP or a client device. The sender of the instruction may be a cloud server, another AP, or a client device. The types of communicated instruction may include: a roaming command, a request to update software or firmware, a transfer of data, a change of channel or band of network broadcast, network security and blocking commands, or other network communication known in the art. In step 404, the instruction is verified with the private key of the receiving device. In some embodiments, this is performed via a challenge to the sending device. In other embodiments, this is performed via a challenge to the instructions themselves. In some embodiments, the instructions are decrypted by the private key. Where the private key cannot decrypt the instructions or the instructions were not encrypted, the private key will fail to decrypt and the instructions will fail. In some embodiments, the instructions will include a partner cryptographic key (e.g., the partner may be cryptographically or mathematically related, comprise a challenge, etc.). The private key and partner key together generate a verification result.

In step 406, the subject device either verifies the instruction or not. In step 408, where the instruction is verified, the subject device will process the instruction. In step 410, where the instruction is not verified, the instructions are dropped.

In an illustrative example, a given AP receives a firmware update. Where this firmware is malicious and intended to compromise the AP, the update will not update the firmware. The AP is configured to prevent changes to the firmware without a partner cryptographic key that is verified by the unique cryptographic key.

In another example, a client device such as a security camera will only transmit video data to a verified network device. Other client devices that may have restricted data transfer may include a home appliance control system, a network switch, or a mobile device.

Figure 5:
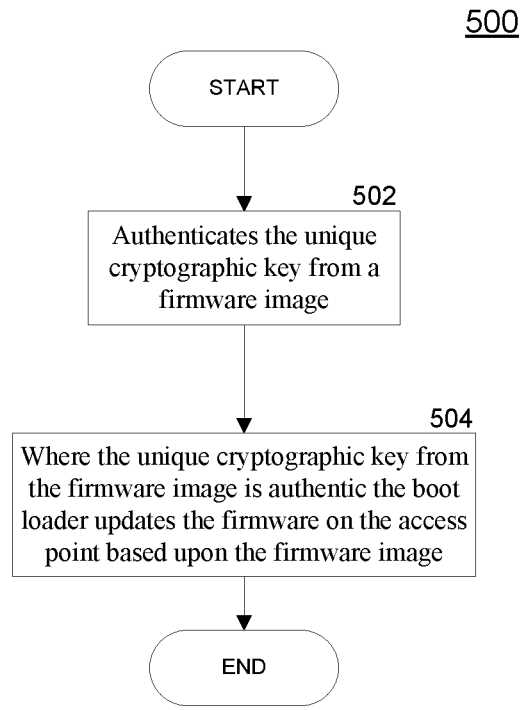
FIG. 5 is a flowchart illustrating a secure boot.

FIG. 5 is a flowchart illustrating a secure boot. In step 502, the boot loader authenticates the unique cryptographic key from a firmware image. In step 504, where the unique cryptographic key from the firmware image is authentic, the boot loader updates the firmware on the access point based upon the firmware image.

Figure 6:
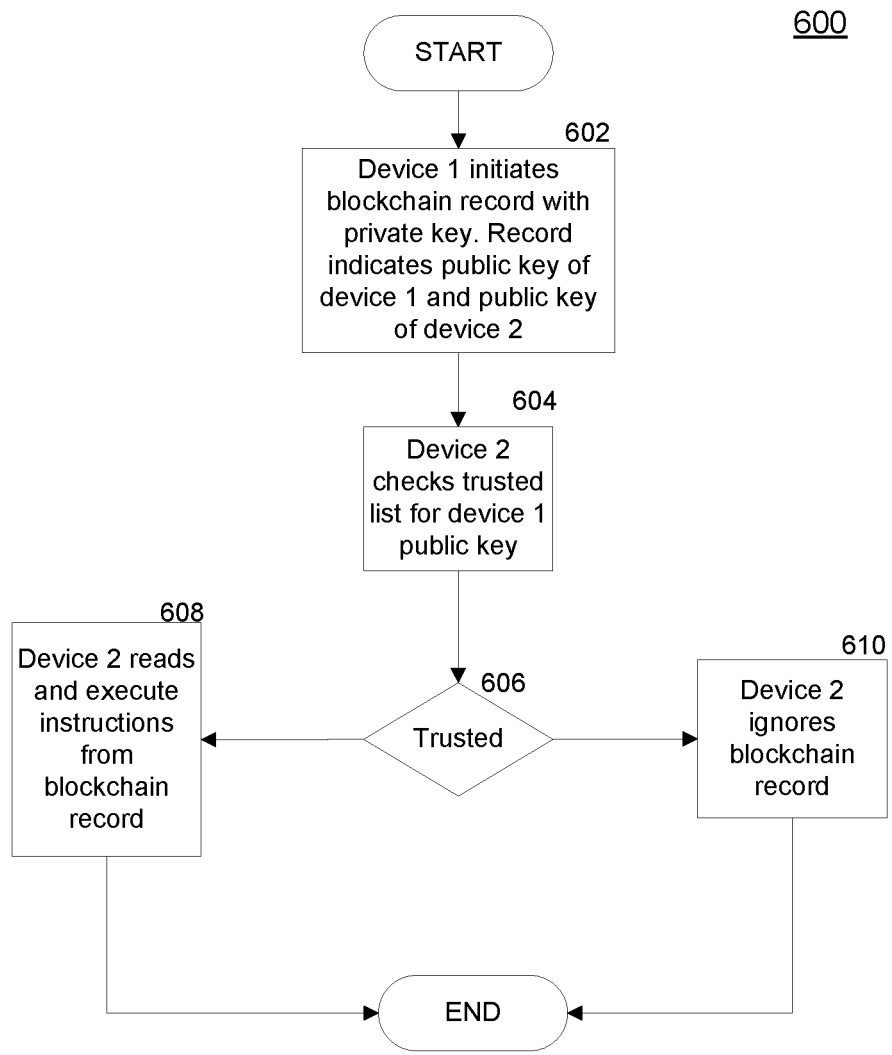
FIG. 6 is a flowchart illustrating blockchain structure enabled security.

FIG. 6 is a flowchart illustrating blockchain structure enabled security. In step 602, a first device initiates a transaction or a record on a blockchain. Generation of the record on the blockchain requires the use of the first device's private key. However, the blockchain is a public ledger, thus, the action of the record is associated with the first device's public key. The record indicates an instruction for a second device. In this case, the first and second device may both be APs, one may be an AP and another is a backend server, and one or both may be client devices. A number of other configurations exist, similar to the examples of FIG. 4. Blockchains are often enables by a cryptocurrency such as Bitcoin or Ethereum. Data or smart contracts can be encoded to the transactions/records on the blockchain. Thus, the record can include an instruction or software/firmware updates posted publically. An entire firmware update may be included in the record, or alternatively, the record may include a link where the AP is instructed to retrieve the firmware update from.

In the case of AP to AP instructions, the rate of Bitcoin updates may be too slow (approx. 1 block per 10 minutes). A roam command or channel/frequency shift instruction operates on a much faster time scale. Thus, for this type of instruction, a different cryptocurrency should be used that operates on a similarly fast time scale. Conversely, for firmware updates, a time scale of 10 minutes is acceptable. Firmware updates are relatively few and far between; if a given AP is delayed in receiving its respective update by 10 minutes, it is not of great concern.

In step 604, the second device checks an established trusted device list for the first device's respective public key. The second device is constantly watching the blockchain for records to appear that reference the second device's public key (i.e., an instruction that is directed to the second device).

In step 606, the second device determines whether the first device has sufficient trust to issue the instruction included in the record of step 602. In step 608, where the first device has the requisite trust level as indicated by the second device's internal trust list, the second device will process the instruction from the blockchain. In some embodiments, the second device may record an acknowledgement record on the blockchain. In step 610, where the first device does not have the requisite trust, the blockchain record is ignored.

In some embodiments, the device will not perform certain actions unless it receives trusted instructions to do so on the blockchain. In this way, each device (e.g., an AP or client device) has a public record that may be examined by network security officers for irregularity.

Figure 7A:
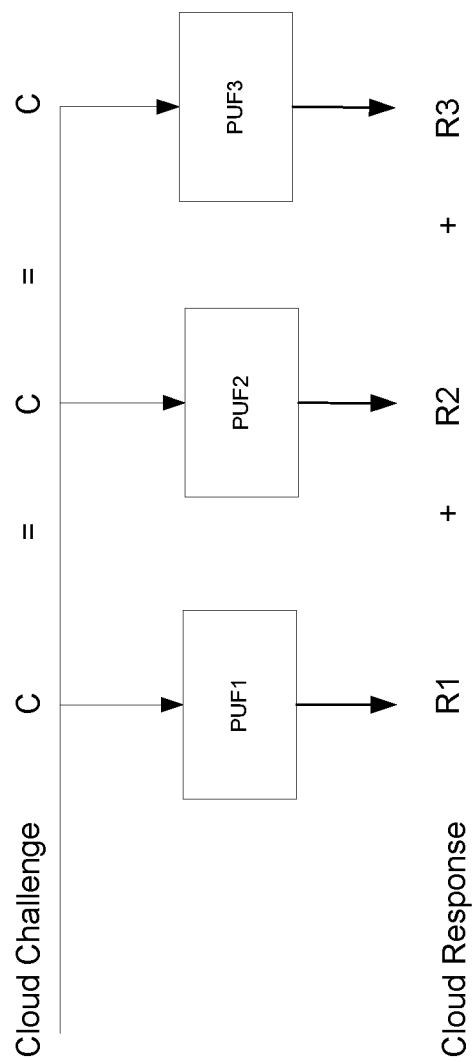
FIG. 7A is a graphic flowchart of a multi-challenge response authentication scheme.

FIG. 7A is a graphic flowchart of a multi-challenge response authentication scheme. In some embodiments, the PUF on more than one access point may be used to authenticate a devices or set of devices to a cloud server for a given access point or family of access points. In such a case, each PUF may be used as a part of a challenge response in order to authenticate each unit. If all units are authenticated, the system can communicate with the cloud. In this manner, each device becomes a part of a multi-factor authentication scheme. Where a challenge response process occurs, the process occurs on all (or a subgroup of) devices that are linked together on a local network. If each of the associated devices respond, then then network communication is legitimate. If only a single device communicates, then the device is either compromised or not on the right network In some embodiments, a mobile device (such as a smartphone) is included in the group of devices used to authenticate. Where a mobile does not itself include a PUF, it may authenticate (interact with a challenge response scheme) in another fashion (as disclosed elsewhere in this disclosure or otherwise known in the art).

In some embodiments, a new device is added through verification of the combined previous devices, or via a mobile application. For example, within a network of access points a user may want to include a wireless security camera. This device may communicate with a cloud server ins a similar fashion as the access points. This security camera may be added to the group of devices used for group authentication.

In this fashion, where a malicious actor has compromised or cloned a single device on a network there is no access to the cloud server or the local wireless network because not all of the devices included in the group authentication are maliciously controlled.

Figure 7B:
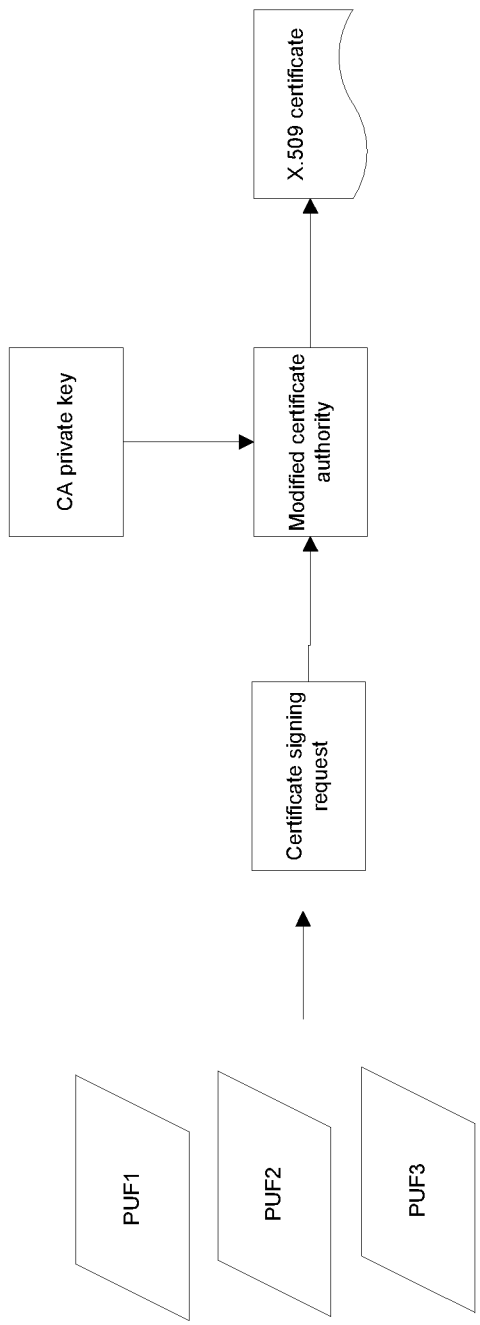
FIG. 7B is a graphic flowchart illustrating multiple devices corresponding with a certificate authority.

FIG. 7B is a graphic flowchart illustrating multiple devices corresponding with a certificate authority. In some embodiments, PUF may be used as base to create a certificate for a device. A certificate authority (CA) is an entity that issues digital certificates which may be based on standards such as ISO X.509 standard. The CA issues signed digital certificates that affirm the identity of the certificate subject and bind that identity to the public key contained in the certificate. The identity detection may be done using PUF on one more units. This embodiment is similar to that of FIG. 7A, though rather than operating on a challenge response scheme, a certificate authority scheme is used instead. The multiple (three are pictured in the figure)

The CA also typically manages certificate revocation which may be done when a unit is returned or taken out of operation for any reason. For example, SSL/TLS certificates may be used to allow a camera and a sensor to identify and establish encrypted network connections to home monitoring sever using Secure Sockets Layer/Transport Layer Security (SSL/TLS) protocol. Certificates are used within a cryptographic system known as a public key infrastructure (PKI). PKI provides a way for one party to establish the identity of another party using certificates if they both trust a third party—known as a certificate authority. PUF can add more security to establish identity by storing some parts or hash of a key or by performing a unique operation on a challenge that is sent by one side to other side.

Other than using PUF or in combination of using PUF, the cloud server may use non-volatile memory (eNVM), including ROM, OTP or Flash to establish root of trust for firmware upgrade or secure boot. The eNVM is then made write protected, therefore non-modifiable by external attacks. One time programmable memory (OTP) may be on the CPU chip. The combination of eNVM on all units may be used to verify what software runs on the unit or what software is unit loaded with.

When secure boot is used, the cloud server may also authenticate and integrity check on application layer code by following chain of trust. For example, a key-based verification (decryption) of integrity and authenticity for our application later code may take place to ensure the code can be trusted. The key may be stored on eNVM on one or all units when we have WiFi systems. In some example, key may be only on one AP. In some others key may be on two or more APs. In some other cases, part of key may be on one AP and part may be on other AP.

Before deploying any software or firmware upgrades to a given device, the cloud server may perform a check through authenticated channels, the originator of the code produces a digital signature of the code. The originator does so by generating a unique "digest" for that code through a hashing algorithm, like SHA-2 or SHA-3.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A system of networked access points comprising:
a first access point configured to communicate with and provide Internet access to client devices over a network, wherein the first access point communicates with a configuration server over the Internet and includes a first physical unclonable function (PUF) associated with a first processor of the first access point;
a second access point networked with the first access point via a backhaul channel and further propagating a network signal of the network to client devices, wherein the second access point includes a second PUF associated with a second processor of the second access point; and
a mobile device communicatively coupled with the first access point as a first client device, the mobile device including a third PUF associated with a third processor of the mobile device, wherein the first PUF, the second PUF of the respective first access point and second access point and the third PUF are included in a multi-factor authentication scheme that authenticates the access points of the network to the configuration server.

2. The system of claim 1, wherein each of a set of other access points networked with the first access point includes a PUF that is a factor in the multi-factor authentication scheme.

3. The system of claim 1, wherein a subset of access points of the system each include a PUF that is a factor in the multi-factor authentication scheme.

4. The system of claim 1, wherein the mobile device is an Internet-of-Things (IoT) device.

5. The system of claim 1, wherein the configuration server delivers firmware upgrades to the first access point and second access point based on the authentication of the access points of the network to the configuration server.

6. The system of claim 1, wherein the multi-factor authentication scheme is one of:
a multi-challenge response authentication scheme, wherein each factor of the scheme must successfully respond to a cloud challenge; or
based on a certificate authority scheme, wherein the first PUF and second PUF are used as bases to create the certificates.

7. A method of network authentication via multiple access points comprising:
providing a first physical unclonable function (PUF) associated with a first processor of a first access point;
providing a second PUF associated with a second processor of a second access point;
providing a third PUF associated with a third processor of a mobile device communicatively coupled with the first access point as a first client device;
broadcasting a network signal by the first access point and the second access point, wherein the network signal provides Internet access to client devices;
communicating, by the first access point over the Internet, with a configuration server, wherein the first access point authenticates with the configuration server and the first PUF, second PUF, and the third PUF are used in a multi-factor authentication scheme to authenticate the first access point to the configuration server.

8. The method of claim 7, further comprising providing a PUF associated with each processor of a set of other access points within the network, wherein each such PUF is used in the multi-factor authentication scheme.

9. The method of claim 7, further comprising providing a PUF associated with each processor of a subset of other access points within the network, wherein each such PUF is used in the multi-factor authentication scheme.

10. The method of claim 7, wherein the mobile device is an IoT device.

11. The method of claim 7, further comprising:
receiving, from the configuration server, firmware upgrades by the first access point and second access point based on the authentication of the first access point.

12. The method of claim 7, wherein the multi-factor authentication scheme is one of:
a multi-challenge response authentication scheme, wherein each factor of the scheme must successfully respond to a cloud challenge; or
based on a certificate authority scheme, wherein the first PUF and second PUF are used as bases to create the certificates.

13. A method of network authentication via multiple access points comprising:
providing a first PUF associated with a first processor of a first access point;
providing a second PUF associated with a second processor of a second access point;
providing a third PUF associated with a third processor of a mobile device communicatively coupled with the first access point as a first client device;
broadcasting a network signal by the first access point and the second access point, wherein the network signal propagates a network and provides Internet access to client devices; and
communicating, by the first access point over the Internet, with a configuration server, wherein the first PUF, second PUF and the third PUF are used in a multi-factor authentication scheme to authenticate a set of devices on the network, comprising the first access point, to the configuration server.

14. The method of claim 13, further comprising providing a PUF associated with each processor of a set of other access points within the network, wherein each such PUF is used in the multi-factor authentication scheme.

15. The method of claim 13, wherein the mobile device is an IoT device.

16. The method of claim 13, further comprising delivering, by the configuration server, firmware upgrades to the first access point and second access point based on the authentication of the set of devices on the network.

17. The method of claim 13, wherein the multi-factor authentication scheme is one of:
a multi-challenge response authentication scheme, wherein each factor of the scheme must successfully respond to a cloud challenge; or
based on a certificate authority scheme, wherein the first PUF and second PUF are used as bases to create the certificates.

* * * * *